US008228044B2

(12) United States Patent
Kötz et al.

(10) Patent No.: US 8,228,044 B2
(45) Date of Patent: Jul. 24, 2012

(54) DETACHABLE CHARGE CONTROL CIRCUIT FOR BALANCING THE VOLTAGE OF SUPERCAPACITORS CONNECTED IN SERIES

(75) Inventors: Rüdiger Kötz, Gippingen (CH); Jean-Claude Sauter, Untersiggenthal (CH)

(73) Assignees: Conception et Developpement Michelin S.A., Givisez (CH); Paul Scherrer Institut, Villigen PSI (CH)

( * ) Notice: Subject to any disclaimer, the term of this patent is extended or adjusted under 35 U.S.C. 154(b) by 1044 days.

(21) Appl. No.: 11/663,874

(22) PCT Filed: Sep. 14, 2005

(86) PCT No.: PCT/EP2005/054564
§ 371 (c)(1),
(2), (4) Date: Jul. 14, 2008

(87) PCT Pub. No.: WO2006/032621
PCT Pub. Date: Mar. 30, 2006

(65) Prior Publication Data
US 2008/0309295 A1    Dec. 18, 2008

(30) Foreign Application Priority Data
Sep. 24, 2004  (EP) .................................... 04022782

(51) Int. Cl.
*H02J 7/00*    (2006.01)
*H02M 3/06*    (2006.01)
*H02M 3/18*    (2006.01)

(52) U.S. Cl. ........ 320/166; 320/167; 320/124; 320/132; 307/109; 363/59

(58) Field of Classification Search .................... 320/166
See application file for complete search history.

(56) References Cited

U.S. PATENT DOCUMENTS
5,610,495 A    3/1997    Yee et al.
(Continued)

FOREIGN PATENT DOCUMENTS
FR    2 778 507 A    11/1999
(Continued)

OTHER PUBLICATIONS

Gottas, "Single cell battery management systems (BMS)", Telecommunications Energy Conference, 2000, Piscatway, NJ, IEEE, Sep. 10, 2000, pp. 695-702.

*Primary Examiner* — Yalkew Fantu
(74) *Attorney, Agent, or Firm* — Cozen O'Connor

(57) ABSTRACT

A supercapacitors voltage balancing device (2) to be connected to a supercapacitor module (1) having N individual supercapacitors (10) connected in series, for optimizing the voltage of the individual supercapacitors in the module. The voltage balancing device comprising connecting means (3) for connecting said voltage balancing device (2) to said supercapacitor module (1); a selector unit (21) for selectively connecting a group of P individual supercapacitors (10), with P<N, to be subject in the same time to a voltage optimization processing; a voltage measuring unit (22) to determine the voltage of selected supercapacitor(s) (10); a charge adjusting unit (23), comprising voltage adjustment means for connecting in parallel to P individual supercapacitors (10) for adjusting in the same time the voltage of said P individual supercapacitors; a controller (24) for controlling the selector unit (21), the voltage measuring unit (22) and the charge adjusting unit (23) and comprising evaluation means in order to determine which ones of the individual supercapacitors will be subject to the voltage optimization processing.

18 Claims, 4 Drawing Sheets

U.S. PATENT DOCUMENTS

| | | | |
|---|---|---|---|
| 5,821,733 A | 10/1998 | Turnbull et al. | |
| 5,952,815 A * | 9/1999 | Rouillard et al. | 320/116 |
| 6,249,125 B1 * | 6/2001 | Haddad et al. | 324/426 |
| 6,265,851 B1 * | 7/2001 | Brien et al. | 320/162 |
| 6,316,917 B1 * | 11/2001 | Ohta | 320/166 |
| 6,317,343 B1 * | 11/2001 | Okamura et al. | 363/59 |
| 6,323,623 B1 * | 11/2001 | Someya et al. | 320/166 |
| 6,812,591 B2 * | 11/2004 | Umemura et al. | 307/66 |
| 2002/0167291 A1 | 11/2002 | Imai et al. | |
| 2002/0167297 A1 * | 11/2002 | Nozu et al. | 320/166 |
| 2003/0214267 A1 | 11/2003 | Long | |

FOREIGN PATENT DOCUMENTS

| | | |
|---|---|---|
| WO | WO 99/01918 A2 | 1/1999 |
| WO | WO 2004/030177 A | 4/2004 |

* cited by examiner

DETACHABLE CHARGE CONTROL CIRCUIT FOR BALANCING THE VOLTAGE OF SUPERCAPACITORS CONNECTED IN SERIES

RELATED APPLICATION

This is a U.S. National Phase Application under 35 USC 371 of International Application PCT/EP2005/054564, filed on Sep. 14, 2005.

FIELD OF THE INVENTION

The present invention relates to a method and a device for voltage balancing of a plurality of supercapacitors.

BACKGROUND OF THE INVENTION

Supercapacitors represent very promising components in the field of electrical energy storage. Many applications are currently being developed as peak-power sources in high-power applications such as hybrid vehicle motors or fuel cell powered vehicles. In applications like these, power supplies are needed and also regenerative braking requires to charge storing devices under high currents.

A supercapacitor module generally comprises a plurality of individual supercapacitors which generally all have the same nominal electrical parameters (same capacity, same internal resistance) and are all connected in series. This is because the nominal voltage of an individual supercapacitor is low, typically in the range of 2.5 Volt. Because the applications mentioned above generally require voltages exceeding a few tens of volts, or even a few hundreds of volts, a number of individual supercapacitors are connected in series to provide a module fulfilling the specifications of use for instance in automotive applications.

In charging mode for instance during regenerative braking as well as in discharging mode during power supply for moving the vehicle or other use of electrical energy, the current is by definition identical in all the individual supercapacitors, because the supercapacitors are connected in series. The voltage at the terminal of each individual supercapacitor should also be identical. However, it is known that there is a spread of the characteristics—capacitance for example—of the supercapacitors relative to each other, due to manufacturing tolerances and/or due to different aging of the individual supercapacitors, and possibly to a temperature gradient within the module, due to its environment. This leads to different ends of charging voltages for each of the supercapacitors. Also, different leakage currents for each of the supercapacitors of the module can cause the voltages of the single cells to diverge.

This problem compromises correct operation of the supercapacitor module. Some supercapacitors of the module may reach voltages exceeding their nominal charging voltage, which degrades their characteristics and leads to premature aging or even to failure. Thus, because the supercapacitors are connected in series, the module as a whole cannot function correctly.

To solve this problem, it is known to design bypass circuits connected in parallel with the terminals of each individual supercapacitor of a module comprising a plurality of supercapacitors. The general principle of known supercapacitor balancing systems consists in bypassing some or all of the supercapacitor charging current in order to equate the final charging voltage to a predetermined identical value on the terminals of all the individual supercapacitors.

The bypass circuits can be based on resistors each connected in parallel to the individual supercapacitors, and all connected in series. This solution is the simplest one, but it is energetically inefficient, because current in the resistors generates many losses.

It is also known to connect Zener diodes across each supercapacitor, to limit the maximum voltage value of the supercapacitor, for example at 2.5 Volt. This solution is energetically efficient as far as all voltages are less than the limit value, but the power dissipation can become important if many supercapacitors reach their maximum limit voltage.

Other solutions are based on more sophisticated methods, in order to minimize the energy consumed during balancing operation. It is also known to design active circuits for voltage balancing, as illustrated by U.S. patent application 2003/0214267. But these methods require additional electronic components, which mean additional costs and weight. In case of electronically active or passive balancing devices, the approach described above results in enhanced self discharge of the module.

SUMMARY OF THE INVENTION

It is therefore an object of the present invention to manage the necessary voltage balancing in an improved manner.

Based upon an observation that a module of supercapacitors connected in series can work for days without too detrimental effect on the components, it is proposed to downsize the number of bypass circuits used to optimize the voltages in all the individual supercapacitors.

The invention proposes a supercapacitors voltage balancing device to be connected to a supercapacitor module having N individual supercapacitors connected in series, said module being deprive of permanent means associated with said individual supercapacitors, each terminal of the series of individual supercapacitors as well as each pole between two adjacent individual supercapacitors being each connected to one wire for accessing selectively the N individual supercapacitors, the total number of wires so being N+1, said supercapacitor voltage balancing device being used for optimizing the voltage of the individual supercapacitors in said module, the voltage balancing device comprising:
  connecting means for connecting said voltage balancing device to the N+1 wires of said supercapacitor module;
  a selector unit for selectively connecting a group of P individual supercapacitors, with P<N, to be subject in the same time to a voltage optimization processing;
  a voltage measuring unit to determine the voltage of selected supercapacitor(s);
  a charge adjusting unit for connecting to P individual supercapacitors, comprising at least one of two energy exchange means comprised in a group having energy supply means and energy absorbing means, for adjusting in the same time the voltage of said P individual supercapacitors;
  a controller for controlling the selector unit, the voltage measuring unit and the charge adjusting unit and comprising evaluation means in order to determine which ones of the individual supercapacitors will be subject to the voltage optimization processing.

In a first possible embodiment of the invention, the voltage balancing device is made integral with the supercapacitor module, as usual, but does not comprise as many bypass circuits as the module comprises individual supercapacitors, unlike the designs known in the prior art. Thanks to the said connecting means connecting the voltage balancing device and the series of individual supercapacitors, it is possible to share the use of a limited number of bypass circuits between all the individual supercapacitors.

In a second embodiment of the invention, illustrated below, the supercapacitor voltage balancing device is made as a remote device to be optionally connected to said module of supercapacitors for maintenance operations. Consequently, the modules of supercapacitors can be designed without any bypass circuit or similar voltage optimization circuit. The supercapacitor module includes only the wiring and plug for making access to each terminal of the individual supercapacitors possible from outside. The balancing operation is performed like a maintenance operation while the vehicle stands still. In this case, the voltage balancing device is not on-board and its weight has no influence at all on the performances of the vehicle. This is following this approach that the vehicles can be made as light as possible. Also the device can be used for more than one car, thereby increasing utilization and cost efficiency of the device.

A voltage balancing device is designed to be plugged to said module, and the voltage balancing device works to bring the series of individual supercapacitors in ideal electrical configuration. For instance, this can be performed overnight because, typically, balancing the voltages of the supercapacitors of a module could take time, not only because the balancing operation is performed in several successive phases, as opposed to in one time for all the individual supercapacitors, but also because the section of wires is preferably kept as small as possible to further save weight in wirings. Because of the small section of the wires, it is necessary to work with limited charge and discharge currents, thus increasing the time required for the balancing operation. Also, the resistance of the individual wiring is another reason to work with a limited current for more precision in the balancing operation because the lower the current the lower the relaxation (the relaxation being a drop of voltage after charging and/or a voltage rise after discharging).

However, it is observed that the time required for balancing the voltages, should never exceed the time a vehicle stands still every days, even in case of intense use at least by one driver only.

For the maximum of efficiency during the beginning of a balancing operation, either performed by an on board device or a remote device, the balancing device can also work in priority on the more degraded individual supercapacitors. This is particularly interesting in the case the period the vehicle remains at still is short.

The invention also extends to a method for balancing the electrical configuration of a supercapacitor module having a plurality of individual supercapacitors connected in series, the said module being deprive of permanent means associated with said individual supercapacitors, the method consisting essentially of performing on demand a maintenance operation by on demand connecting a maintenance voltage balancing system to the supercapacitor module and performing a voltage optimization processing comprising the following steps:
  selecting an individual supercapacitor of the module and measuring the voltage of the selected individual supercapacitor;
  determining an ideal voltage zone in which each individual supercapacitor should be;
  exchanging energy between the maintenance voltage balancing system and the selected individual supercapacitor in order to bring the voltage of the selected individual supercapacitor within the ideal voltage zone;
  repeating the above steps for other individual supercapacitors.

More particularly, the selecting step can comprise further scanning all the individual supercapacitors for measuring the voltage of all the individual supercapacitors of the module in order to determine the said ideal voltage zone after a view on the full set of individual supercapacitors.

In a particular aspect, the method for balancing a supercapacitor module comprises identifying which ones of all the individual supercapacitors are the most degraded after the scanning of all the individual supercapacitors for measuring the voltage of all the individual supercapacitors of the module, and the bringing voltage step is performed first on the most degraded supercapacitors. This allows saving balancing time. The voltage balancing device can work in priority on the most degraded individual supercapacitors and postpone the balancing of other individual supercapacitors when the module is no longer in normal use (for instance when the vehicle is not in operation for an on-board device). Thereby, the voltage balancing device, particularly if made on-board, can be made less heavy and at a lower cost, which is important for many applications, especially in automotive industry.

BRIEF DESCRIPTION OF THE DRAWINGS

Other features and advantages of the present invention will become apparent on reading the following description, which is given by way of illustrative and non-limiting example. In the accompanying drawings.

DETAILED DESCRIPTION OF THE INVENTION

Figure 1:
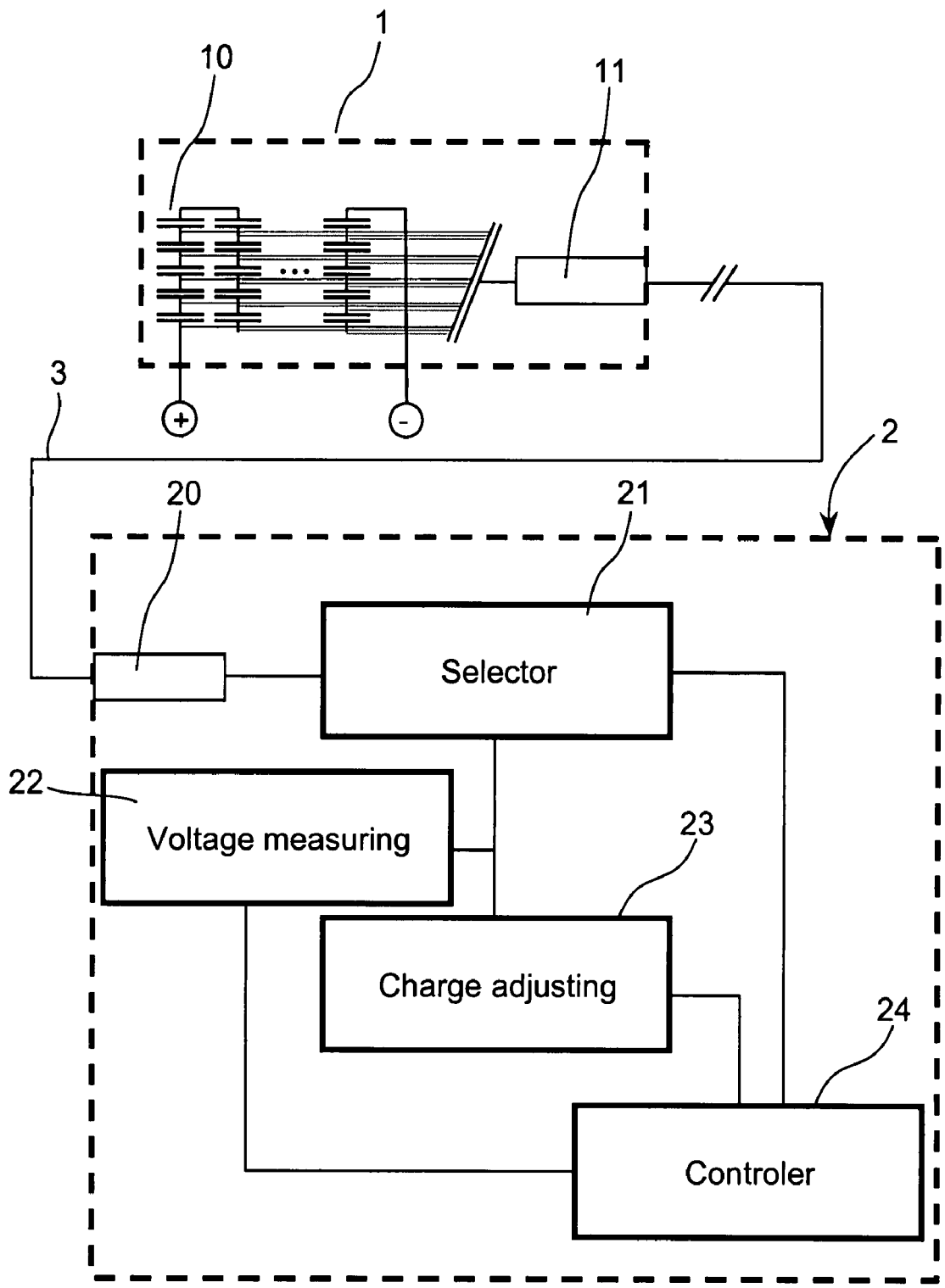
FIG. 1 is a block diagram of a remote voltage balancing device connected to an individual supercapacitors module for a maintenance operation.

In FIG. 1 is shown a module (1) of N=100 supercapacitors (10) connected in series. Typically, a module of supercapacitors includes a large number of individual supercapacitors, at least 20 ($N \geq 20$), and even more typically at least 50 ($N \geq 50$).

Each terminal of the series of individual supercapacitors as well as each pole between two adjacent individual supercapacitors is connected to one wire of an electric connector Plug (11). In this case of 100 supercapacitors, there are 101 wires. Of course one individual supercapacitor can be realized by two or more individual supercapacitors connected in parallel, which the man skilled in the art will recognize as equivalent.

The supercapacitors voltage balancing device (2) comprises a plug (20), a selector (21), a voltage measuring unit (22), a charge adjusting unit (23), and a controller (24). A connecting cable (3) interconnects the plug (11) of the supercapacitor module (1) and the plug (20) of the balancing device (2). This cable contains one to one connections between the plug (10) on the supercapacitor module (1) and the plug (20) on the balancing device (2).

In this particular embodiment illustrating the invention, the individual supercapacitors (10) are subject to the voltage optimization processing one by one. Consequently, the charge adjusting unit (23) comprises a single voltage adjustment means for being connected to one single individual supercapacitor (10) by the controller (24).

A particular embodiment of the selector unit (21) is described in connection with FIGS. 2 and 3. the selector unit (21) is realized in two parts: a first separation stage (211) designed for selecting one intermediate group of Q supercapacitors, and a single second separation stage (216) for finally selecting a smaller group of P supercapacitors to be connected to the charge adjusting unit (23). More particularly, the design choice here is P=1 and Q=20. As the supercapacitor module comprises 100 individual supercapacitors (10) and the design choice is so that Q=20, there are 5 first separation stages (211). Each one of said 5 first separation stage (211) is interconnected to said single second separation stage (216) by a bus (212) having Q+1 wires (so 21 wires).

Incoming from the one of the 100 supercapacitors (10) of the module (1) through plug (20), the first wire is connected to a fuse (213), then to a switch (214) and then to the first wire of the 21 existing in the bus (212). Incoming from the next of the 100 supercapacitors (10) of the module (1) through plug (20), the second wire is connected to a fuse (213), then to a switch (214) and then to the second wire of the 21 existing in the bus (212). And so on for 21 wires corresponding to Q=20 supercapacitors. A relay (215) controlled by the controller (24) controls 21 switches (214).

Figure 2:
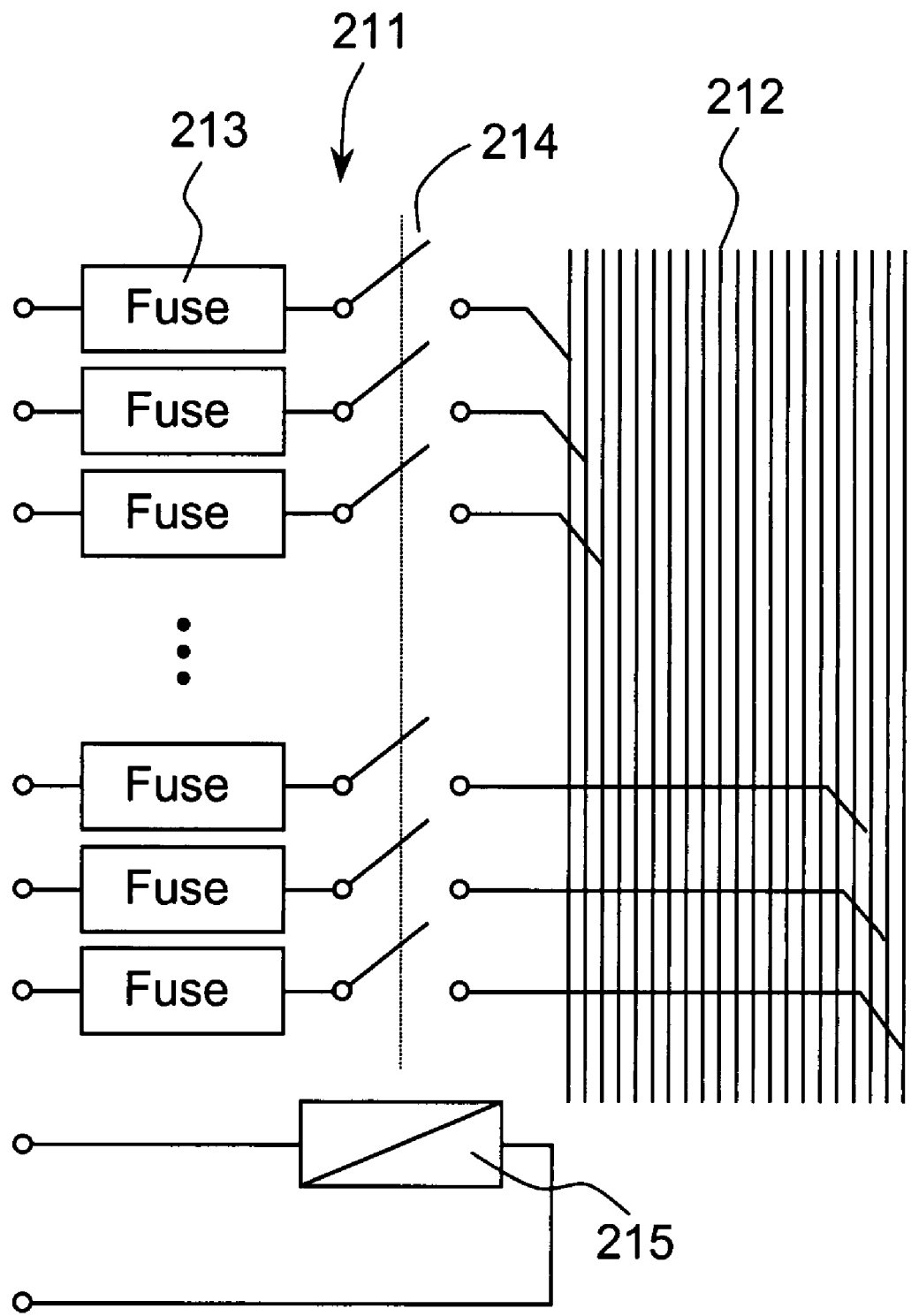
FIG. 2 shows in more details a first part of a particular embodiment of the selector unit of a voltage balancing device.

The layout of FIG. 2 is repeated five times, so that the 5 groups of 20 supercapacitors are potentially connected to the 21 wires of the bus (212). The first separation stage (211) is operated by 5 relays (215) which are exclusively controlled by the controller (24). One can only connect or disconnect a group of 20 individual supercapacitors (10) to the bus (212) simultaneously. When the 5 signals controlling the five relays (215) are "off", no input on the unit is connected to the bus (212).

The function of the first separation stage is to pre-select 20 supercapacitors (10) out of the 100 individual supercapacitors (10).

Figure 3:
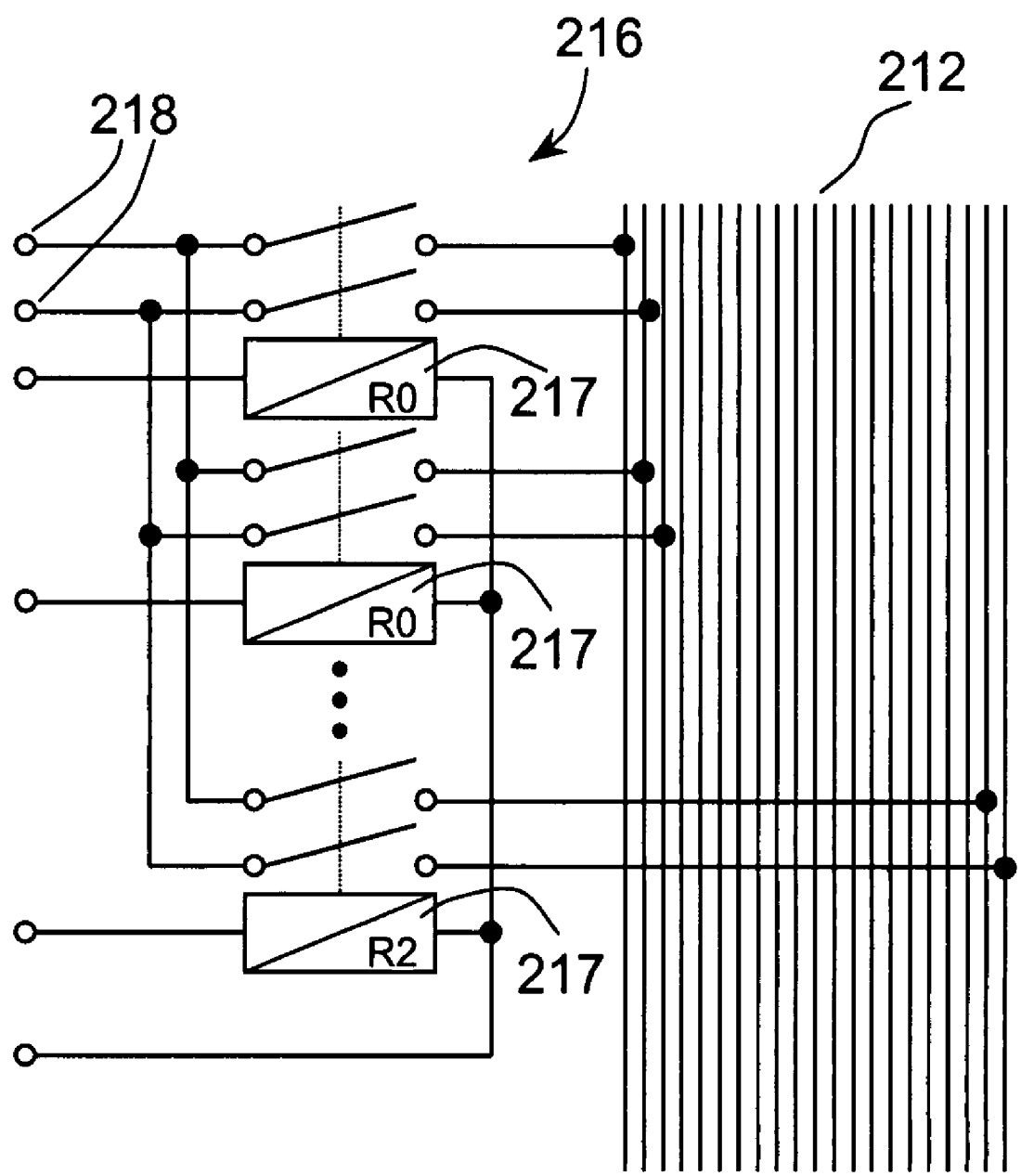
FIG. 3 shows in more details a second part of a particular embodiment of the selector unit of a voltage balancing device.

The second separation stage is shown in FIG. 3. It comprises 20 relays individually controlled, each one operating a 2-lines switch (216) connected at one terminal to the 2 wires of the bus (212) corresponding to one single supercapacitor (10) inside the selected group of 20 supercapacitors, and to a line (218) connected to the charge adjusting unit (23) at the other terminal. Because of the design choice P=1, there is a single line (218).

The function of the second separation stage (216) is to connect one single supercapacitor out of the 20 pre-selected supercapacitors (10) to the charge adjusting unit (23) in order to charge or discharge the corresponding supercapacitor (10).

In the embodiment illustrating the invention, the voltage measuring unit (22) comprises essentially one single channel for voltage measuring. However, the number of voltage measuring unit is not dependent on the number of supercapacitors processed at one time, except that it has to be at least equal to said number of supercapacitors processed at one time. The voltage measuring unit could be somewhat integrated in the selector unit, for instance between the first separation stage (211) and the second separation stage (216).

The charge adjusting unit (23) can contain the electrical component to perform charging the individual supercapacitors (10) as well as the electrical component to perform discharging the individual supercapacitors (10). Charging or discharging is selected by the controller (24) in view of data acquired with the voltage measuring unit (22) and of predetermined voltage ideal values.

In another approach, the charge adjusting unit (23) contains only electrical component to perform a charging operation or contains only electrical component to perform a discharging operation but not both. This is to further simplify the device and reduce as much as possible the weight and the cost, especially for on-board devices. Consequently, in a first particular case, a supercapacitors voltage balancing device according to the invention is characterized by the fact that the energy exchange means in the charge adjusting unit (23) comprises power supplying means and no discharging means so that the voltage optimization processing consists of a voltage increasing operation. In a second particular case, a supercapacitors voltage balancing device according to the invention is characterized by the fact that the energy exchange means in the charge adjusting unit (23) comprises discharging means and no power supplying means so that the voltage optimization processing consists of a voltage reducing operation. This is the cheapest embodiment.

Figure 4:
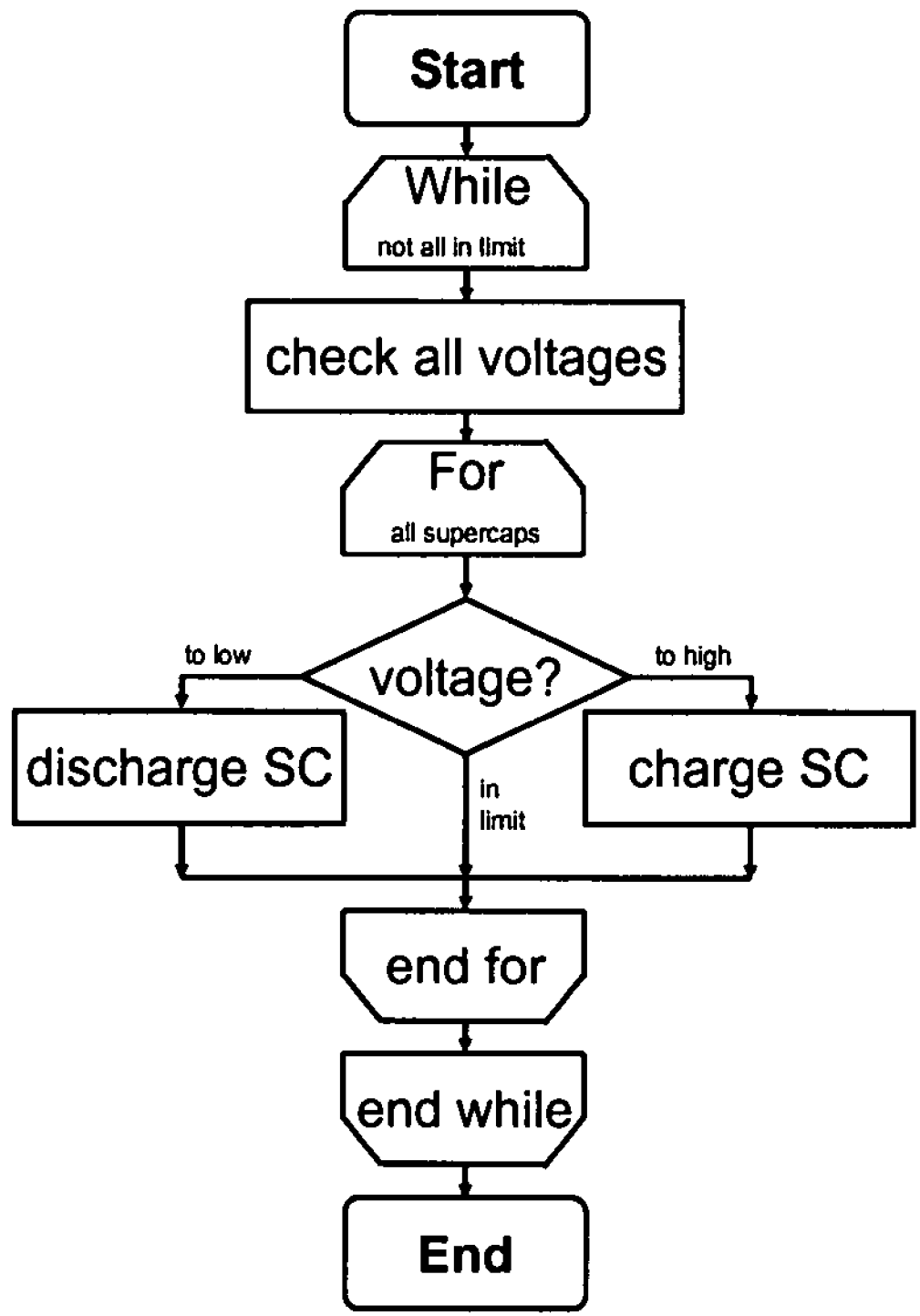
FIG. 4 is a flowchart of a balancing step of all supercapacitors in a module.

FIG. 4 shows the operation of a supercapacitors voltage balancing device having the hardware needed for performing both charging and discharging. The step of determining an ideal voltage step consists essentially of obtaining an upper limit and a lower limit within which each voltage prevailing in each individual supercapacitor should be. The bringing voltage step consists essentially of, for each individual supercapacitor, if its voltage is above the upper limit, discharge the individual supercapacitor in order to bring the supercapacitor's voltage below the upper limit and if its voltage is below the lower limit, charge the individual supercapacitor in order to bring the supercapacitor's voltage above the lower limit.

Each charge or discharge sub-step indicated in the flowchart is performed during a predetermined time or, preferably, during a calculated time. Calculation of time is based on an assumption of a given constant current (limited as explained above), on an assumption of the capacity and on the base of the voltage deviation (calculated from the measured voltage value) with respect of an ideal value. The capacitance of the supercapacitor being known, the deviation with respect to the known ideal potential being obtained from the measurement of the actual potential, taking into account the limited value of the current (see comments above about the section of the wires), the time needed for bringing the supercapacitor to the ideal potential can easily be calculated. For example, if the capacitance is C=2800 Farad, the deviation voltage is 0.1V and the maximum value of the charging or discharging current is I=5 A, the time needed to correct the voltage is t=2800*0.1/5=56 seconds. At the "end for" step, the real voltage is checked and a further charge or discharge step is performed if needed.

In the case the supercapacitors voltage balancing device would have only the hardware needed for performing a discharging operation, the method for balancing a supercapacitor module can be for instance such that a upper limit is determined as an ideal voltage zone, and the bringing voltage step consists essentially of lowering the voltages of the individual supercapacitors where needed to bring all the voltages down to the upper limit.

In the case the supercapacitors voltage balancing device would have only the hardware needed for performing a charging operation, the method for balancing a supercapacitor module can be for instance such that an lower limit is determined as an ideal voltage zone, and the bringing voltage step consists essentially of increasing the voltages of the individual supercapacitors where needed to bring all the voltages up to the lower limit.

Many variations in the hardware and in the method can be achieved. Needless to repeat, for example, that the voltage balancing optimization can be performed on more than one individual supercapacitor at the same time, although not all at the same time according to this invention. For instance, the controller (24) can comprise cascading means for processing a plurality of groups of individual supercapacitors (10) in timely separate sequences. The method for balancing a supercapacitor module comprises in that case selecting a first group of individual supercapacitors and the bringing voltage step is performed in the same time on the individual supercapacitors of said first group, and repeating the balancing step on the individual supercapacitors of the other groups.

Preferably, the balancing of the electrical configuration of a supercapacitor module is performed at balancing at full charge or as close as possible to full charge. At low voltages, the unbalance is not significant. With respect to the variation of the capacity of the individual supercapacitors and the series-connection of the supercapacitors in the module, a balancing at lower voltage would bring the supercapacitors in a unbalanced state at full charge.

The invention can be used of course in automotive application as already mentioned but also to many other applications. In the transport field, we can mention for instance the body control of railway trains, to substitute existing hydraulic systems with electrical systems. In case of a off-board application of the balancing unit, the integration of a memory device in the supercapacitor-module can help to reduce the balancing time, because the characteristics like capacity of each supercapacitor, voltage deviation on the last balancing step, time of the last balancing process etc. of the module can be stored and transferred to the controller before starting the balancing process.

The invention claimed is:

1. A supercapacitor voltage balancing device for connection on demand to a remote supercapacitor module for a maintenance operation, said supercapacitor module having N individual supercapacitors connected in series, said module being deprive of permanent means associated with said individual supercapacitors, each terminal of the series of individual supercapacitors as well as each pole between two adjacent individual supercapacitors being each connected to one wire for accessing selectively the N individual supercapacitors, the total number of wires so being N+1, the module consisting of said N individual supercapacitors, the N+1 wires and a plug for enabling external access by said supercapacitor voltage balancing device to each said terminal of the individual supercapacitors, said supercapacitor voltage balancing device being used for optimizing the voltage of the individual supercapacitors in said module, the voltage balancing device comprising:
   a connecting cable for connecting said voltage balancing device to the N+1 wires of said supercapacitor module;
   a selector unit for selectively connecting a group of P individual supercapacitors, with P<N, to be subject in the same time to a voltage optimization processing;
   a voltage measuring unit to determine the voltage(s) of P individual supercapacitors;
   a charge adjusting unit for connecting to P individual supercapacitors, comprising at least one of two energy exchange means comprised in a group having energy supply means and energy absorbing means, for adjusting in the same time the voltage of said P individual supercapacitors; and
   a controller for controlling the selector unit, the voltage measuring unit and the charge adjusting unit and comprising evaluation means in order to determine which ones of the individual supercapacitors are subject to the voltage optimization processing.

2. The supercapacitor voltage balancing device according to claim 1, wherein the individual supercapacitors are subject to the voltage optimization processing one by one (P=1), the charge adjusting unit comprising a single voltage adjustment means for being connected in parallel to one single individual supercapacitor.

3. The supercapacitor voltage balancing device according to claim 1, wherein the controller comprises cascading means for processing a plurality of groups of P individual supercapacitors in timely separate successive sequences.

4. The supercapacitors voltage balancing device according to claim 1, wherein the selector unit comprises a first separation stage for selecting one intermediate group of Q supercapacitors, and a single second separation stage for finally selecting a smaller group of P supercapacitors (P<Q) in the said intermediate group to be connected to the charge adjusting unit.

5. The supercapacitor voltage balancing device according to claim 4, wherein the group contains one single supercapacitor (P=1), the individual supercapacitors being subject to the voltage optimization processing one by one.

6. The supercapacitor balancing device according to claim 2, wherein the voltage measuring unit comprises essentially one single channel for voltage measuring.

7. The supercapacitor voltage balancing device according to claim 1, wherein the energy exchange means in the charge adjusting unit comprises discharging means and no power supplying means so that the voltage optimization processing consists of a voltage reducing operation.

8. The supercapacitor voltage balancing device according to claim 1, wherein the energy exchange means in the charge adjusting unit comprises power supplying means and no discharging means so that the voltage optimization processing consists of a voltage increasing operation.

9. The supercapacitor voltage balancing device according to claim 1, made integral with the module of supercapacitors.

10. The supercapacitor voltage balancing device according to claim 1, with N being at least equal to 20.

11. The supercapacitor voltage balancing device according to claim 1, with N being at least equal to 50.

12. The method for balancing a supercapacitor module according to claim 11, comprising identifying which ones of all the individual supercapacitors are the most degraded after the scanning of all the individual supercapacitors for measuring the voltage of all the individual supercapacitors of the module, and the bringing voltage step is performed first on the most degraded supercapacitors.

13. A method for balancing the electrical configuration of a remote supercapacitor module having a plurality of individual supercapacitors connected in series, the module being deprived of permanent means associated with said individual supercapacitors, the module consisting of the plurality of individual supercapacitors, wiring and a plug for enabling external access to each individual supercapacitor, the method comprising performing on demand a maintenance operation by on demand connecting a maintenance voltage balancing system to the supercapacitor module and performing a voltage optimization processing comprising the steps of:
   selecting an individual supercapacitor of the module and measuring the voltage of the selected individual supercapacitor;
   determining an ideal voltage zone in which each individual supercapacitor should be;
   exchanging energy between the maintenance voltage balancing system and the selected individual supercapacitor in order to bring the voltage of the selected individual supercapacitor within the ideal voltage zone;
   repeating the above steps for other individual supercapacitors.

14. The method for balancing a supercapacitor module according to claim 10, in which the selecting step comprises further scanning all the individual supercapacitors for measuring the voltage of all the individual supercapacitors of the module for determining the said ideal voltage zone.

15. The method for balancing a supercapacitor module according to claim 10, in which the determining an ideal voltage step comprises obtaining an upper limit and a lower limit within which each voltage prevailing in each individual supercapacitor should be, the bringing voltage step comprises, for each individual supercapacitor, if its voltage is above the upper limit, discharge the individual supercapacitor in order to bring the supercapacitor's voltage below the upper limit and if its voltage is below the lower limit, charge the individual supercapacitor in order to bring the supercapacitor's voltage above the lower limit.

16. The method for balancing a supercapacitor module according to claim 10, in which a upper limit is determined as an ideal voltage zone, and the bringing voltage step consists essentially of lowering the voltages of the individual supercapacitors where needed to bring all the voltages down to the upper limit.

17. The method for balancing a supercapacitor module according to claim 10, in which an lower limit is determined as an ideal voltage zone, and the bringing voltage step comprises increasing the voltages of the individual supercapacitors where needed to bring all the voltages up to the lower limit.

18. The method for balancing a supercapacitor module according to claim 10, in which the selecting step comprises selecting a group of individual supercapacitors and the bringing voltage step is performed in the same time on the individual supercapacitors of said group, and repeating the above step on other groups.

* * * * *